United States Patent
Gottinger et al.

(10) Patent No.: US 12,313,765 B2
(45) Date of Patent: May 27, 2025

(54) METHOD FOR REDUCING INTERFERENCE EFFECTS IN A RADAR SYSTEM

(71) Applicant: SYMEO GMBH, Neubiberg (DE)

(72) Inventors: Michael Gottinger, Buckenhof (DE); Peter Gulden, Erding (DE); Martin Vossiek, Fürth (DE)

(73) Assignee: SYMEO GMBH, Neubiberg (DE)

( * ) Notice: Subject to any disclaimer, the term of this patent is extended or adjusted under 35 U.S.C. 154(b) by 382 days.

(21) Appl. No.: 17/765,392

(22) PCT Filed: Sep. 24, 2020

(86) PCT No.: PCT/EP2020/076724
§ 371 (c)(1),
(2) Date: Mar. 30, 2022

(87) PCT Pub. No.: WO2021/069228
PCT Pub. Date: Apr. 15, 2021

(65) Prior Publication Data
US 2022/0404456 A1 Dec. 22, 2022

(30) Foreign Application Priority Data

Oct. 8, 2019 (DE) .......................... 102019126988.1

(51) Int. Cl.
*G01S 7/02* (2006.01)
*G01S 13/58* (2006.01)
*G01S 13/90* (2006.01)

(52) U.S. Cl.
CPC .............. *G01S 7/023* (2013.01); *G01S 13/58* (2013.01); *G01S 13/90* (2013.01)

(58) Field of Classification Search
CPC ........... G01S 7/023; G01S 13/58; G01S 13/90
(Continued)

(56) References Cited

U.S. PATENT DOCUMENTS

2015/0061915 A1* 3/2015 Kishigami ............ G01S 13/288
342/385
2016/0238695 A1* 8/2016 Theurer ................ G01S 13/958
(Continued)

FOREIGN PATENT DOCUMENTS

DE 102014104273 A1 10/2015
DE 102017110063 A1 9/2018
(Continued)

OTHER PUBLICATIONS

Schweizer et al. "Stepped-Carrier OFDM-Radar Processing Scheme to Retrieve High Resolution Range-Velocity Profile at Low Sampling Rate," IEEE Transactions on Microwave Theory and Techniques, 2018 (Year: 2018).*

(Continued)

*Primary Examiner* — James R Hulka
*Assistant Examiner* — Samarina Makhdoom
(74) *Attorney, Agent, or Firm* — Schwegman Lundberg & Woessner, P.A.

(57) ABSTRACT

The invention describes a method for reducing interference effects in a radar system, which has at least two transceiver units (S1, S2), which are in particular spatially separated from one another, wherein the method comprises the following steps: —a transmission step (VS1), in which a first transmission signal (sigTX1) of the first transceiver unit (S1) is sent and received to and by a second transceiver unit (S2) and a second transmission signal (sigTX2) of the second transceiver unit (S2) is sent and received to and by the first transceiver unit (S1) via a radio channel (T), wherein the transmission signals (sigTX1, sigTX2) are modulated according to an orthogonal frequency multiplex method; and—a pre-correction step (VS2), in which correction values (γ1, γn, γ2) are determined from the received transmission signals (sigTX1, sigTX2) and in particular are (Continued)

exchanged between the transceiver stations (S1, S2), wherein the received transmission signals (sigRX1, sigRX2) are postprocessed on the basis of the correction values ($\gamma 1$, $\gamma n$, $\gamma 2$), so that influences of interference variables, in particular of phase noise and/or a time offset and/or unknown initial phase positions, are reduced.

18 Claims, 1 Drawing Sheet

(58) Field of Classification Search
USPC .................................................. 342/25 A
See application file for complete search history.

(56) References Cited

U.S. PATENT DOCUMENTS

| | | | | |
|---|---|---|---|---|
| 2017/0026095 | A1* | 1/2017 | Ashrafi | ............ H04B 7/10 |
| 2017/0176583 | A1* | 6/2017 | Gulden | ............ G01S 13/10 |
| 2018/0203095 | A1* | 7/2018 | Xie | ............ G01S 7/023 |
| 2018/0259619 | A1* | 9/2018 | Eshraghi | ............ G01S 13/87 |
| 2021/0080540 | A1 | 3/2021 | Vossiek et al. | |
| 2021/0405183 | A1 | 12/2021 | Vossiek et al. | |

FOREIGN PATENT DOCUMENTS

| | | | | |
|---|---|---|---|---|
| DE | 102017110404 | | 11/2018 | |
| WO | WO-2017118621 A1 * | 7/2017 | ........... G01S 13/878 |
| WO | WO-2018115370 A1 * | 6/2018 | ........... G01S 13/003 |

OTHER PUBLICATIONS

Schweizer et al. "Stepped-Carrier OFDM-Radar Processing Scheme to Retrieve High Resolution Range-Velocity Prole at Low Sampling Rate," IEEE Transactions on Microwave Theory and Techniques DOI: 10.1109/TMTT.2017.2751463, pp. 1-9 (Year: 2018).*

European Patent Office, International Search Report and Written Opinion for PCT/EP2020/076724, Dec. 7, 2020, 11 pages.

* cited by examiner

METHOD FOR REDUCING INTERFERENCE EFFECTS IN A RADAR SYSTEM

CROSS REFERENCE TO RELATED APPLICATIONS

This application is a U.S. National Phase application, filed under 35 U.S.C. § 371, of International Application No. PCT/EP2020/076724, filed Sep. 24, 2022, which claims priority to, and the benefit of foreign German Patent Application No. 102019126988.1 filed Oct. 8, 2019. The entire contents of which are incorporated herein by reference in their entireties.

Figure 1:
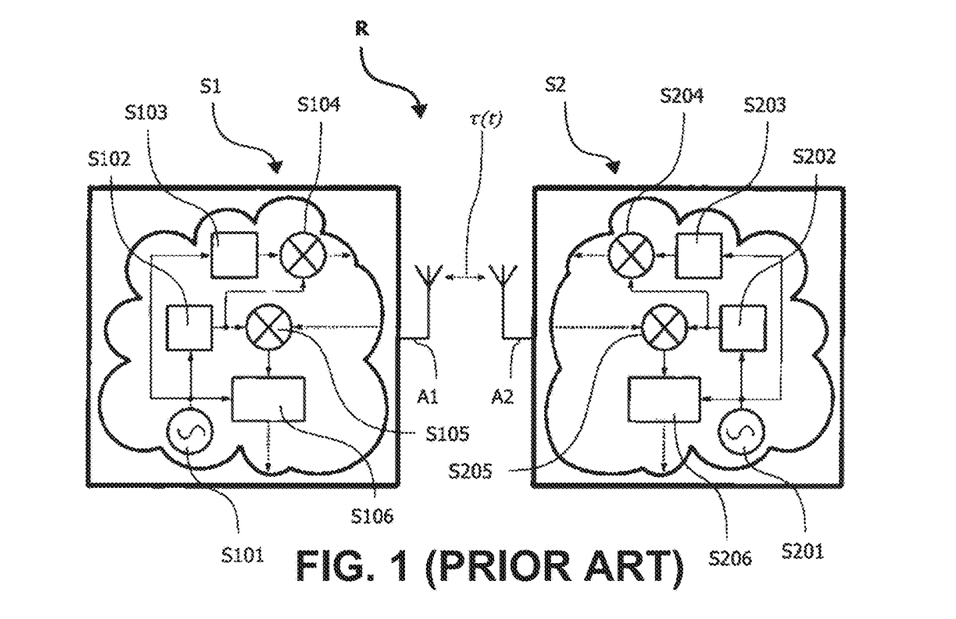
FIG. 1 shows two transceiver units, as are found in the prior art.

FIG. 1 shows a radar system R, which comprises two spatially separated, noncoherent transceiver units S1, S2. The transceiver units S1, S2 each have a local oscillator as a clock source S101, S201, a modulator S103, S203, at least two mixers S104, S105, S204, S205, an analog-to-digital converter S106, S206, and a phase-locked loop S102, S202.

The clock sources S101 and S201 of the transceiver units S1, S2 influence both the transmission of signals and also the reception of signals, since, for example, the sampling times of the analog-to-digital converters S106, S206 are determined by the clock sources S101, S201. In addition, the clock sources S101, S201 are also used as the reference of the respective phase-locked loops S102, S202, which are designed to generate high-frequency carrier signals. The modulators S103, S203 each generate digital baseband transmission signals sigTX1$b$, sigTX2$b$ in both transceiver units S1, S2.

The two mixers S104, S105, S204, S205 of the respective transceiver units S1, S2 are used for upmixing the baseband transmission signals sigTX1$b$, sigTX2$b$ and for downmixing the reception signals sigRX1, sigRX2 to form baseband reception signals sigRX1$b$, sigRX2$b$. The baseband reception signals sigRX1$b$, sigRX2$b$ are sampled using the analog-to-digital converters S106, S206.

In the patent application WO 2017 118 621 A1, the transceiver units S1, S2 transmit and receive signals according to a full-duplex method at (approximately) the same time via an (approximately) identical, (quasi-)reciprocal radio channel, wherein the transmitted and received signals are in particular pulse-modulated or frequency-modulated continuous wave (FMCW) signals.

In full-duplex methods having a plurality of transceiver units, efficient multiplexing between the transceiver units is required. Orthogonal frequency divisional multiplexing (OFDM) methods are preferably suitable for efficient multiplexing, since OFDM methods enable high data rates and efficient multiplexing of multiple users.

One possible interference effect in communication systems which use signals modulated according to the OFDM method is phase noise. The effect of phase noise in communication systems, for example on the bit error rate of communication systems, is analyzed, for example, in T. Pollet, M. Van Blade, and M. Moeneclaey, "BER Sensitivity of OFDM Systems to Carrier Frequency Offset and Wiener Phase Noise," IEEE Trans. Commun., vol. 43, no. 2, pp. 191-193, 1995.

Furthermore, in communication systems which use signals modulated according to OFDM methods, phase noise can result in an equal phase shift of the symbols in all subcarriers, which is called common phase rotation (CPR). This is described, for example, in A. G. Armada, "Understanding the Effects of Phase Noise in Orthogonal Frequency Division Multiplexing (OFDM)," IEEE Trans. Broadcast, vol. 47, no. 2, pp. 153-159, 2001.

A further effect of phase noise is in particular inter-carrier interference (ICI), wherein the orthogonality of the subcarriers is disturbed and undesired mutual crosstalk of the subcarriers can occur.

In communication systems, compensation methods are typically used, in which the effects of phase noise in communication systems are compensated using pilot carriers, as described, for example, in F. Munier, T. Eriksson, and A. Svensson, "Receiver Algorithms for OFDM Systems in Phase Noise and AWGN," DOI 10.1109/PIMRC.2004.1368348, no. 3, 2004 and in the publication of R. Corvaja and A. G. Armada, "Joint Channel and Phase Noise Compensation for OFDM in Fast-Fading Multipath Applications," IEEE Trans. Veh. Technol., vol. 58, no. 2, pp. 636-643, 2009.

The above-mentioned compensation methods presume, however, that the transceiver units are (completely) synchronized, which means in particular the channel properties, thus the transmission time and changes of the transmission time of signals transmitted via the channel, are compensated.

In this way, the compensation methods applied in communication methods are poorly suitable for the compensation of phase noise in radar methods, since in particular items of information about the channel properties—transmission times and change of the transmission times—are removed by the compensation methods. In radar methods, however, items of information about the channel properties are evaluated to calculate distances and/or relative velocities therefrom.

Using the known radar methods, in which signals are used which are modulated according to an OFDM method, up to this point only low accuracies have been achieved for locating of the transceiver units and/or of passive objects (radar targets), which are in particular only in the centimeter to meter range.

For example, a radar method is described in T. E. Abrudan, A. Haghparast, and V. Koivunen, "Time Synchronization and Ranging in OFDM Systems Using Time-Reversal," IEEE Trans. Instrum. Meas., vol. 62, no. 12, pp. 3276-3290, 2013, which attempts to compensate for the interfering effects as much as possible. However, the results achievable up to this point of the known radar methods are well below the theoretically achievable limit for the achievable accuracy, as described, for example, in T. Wang, Y. Shen, S. Mazuelas, H. Shin, and M. Z. Win, "On OFDM Ranging Accuracy in Multipath Channels," IEEE Syst. J., vol. 8, no. 1, pp. 104-114, 2014.

It is therefore the object of the invention to provide a radar method that the signals of the transceiver units are modulated according to an orthogonal frequency modulation method, wherein a comparatively high accuracy is achieved for locating the transceiver units and/or passive objects.

In particular, the object is achieved by a method for reducing interference effects in a radar system which has at least two transceiver units, which are in particular spatially separated from one another, wherein the method comprises the following steps:

a transmission step, in which a first transmission signal of the first transceiver unit is sent to and received by a second transceiver unit and a second transmission signal of the second transceiver unit is sent to and received by the first transceiver unit via a radio channel, wherein the transmission signals are modulated according to an orthogonal frequency multiplex method; and
  a pre-correction step, in which correction values are determined from the received transmission signals, and in particular are exchanged between the transceiver stations, wherein the received transmission signals are preferably postprocessed on the basis of the correction values, so that influences of interference variables, in particular of phase noise and/or a time offset and/or unknown initial phase positions, are reduced, preferably compensated.

One concept of the invention is based on the fact that correction values can be determined in a pre-correction step, using which it is possible to postprocess (or post edit) the transmission signals received in the transceiver units, wherein the influence of the interference variables, which can in particular comprise phase noise and/or a time offset and/or unknown initial phase positions in signals modulated according to an OFDM method, on the transmission signals received in the transceiver units can be reduced (in particular compensated) using the determined correction values.

In particular, the determination of the correction values and the postprocessing of the received transmission signals can be carried out in a simple manner, wherein the computing demands can be relatively low. In addition, the correction values and/or comparison values and/or raw data which are determined and/or used can preferably be exchanged between the transceiver units by an (approximately) simultaneous (chronologically overlapping) data transmission, which is enabled by the OFDM method.

In particular, (simultaneous) operation of multiple spatially distributed transceiver units is enabled by efficient multiplexing, which is achieved by the application of transmission signals (OFDM transmission signals) modulated according to an OFDM method. The various transceiver units are preferably allocated onto different subcarriers of the OFDM transmission signals.

The suppression of phase noise in particular enables an increase in accuracy in a determination of distances and/or relative velocities between the transceiver units and of distances and/or angles and/or relative velocities of passive objects.

In addition, during a transmission using OFDM transmission signals, the clock rate of the local oscillators can be equalized before the transmission, due to which the calculation of a fast Fourier transform (FFT), also in multiple dimensions, can be enabled. In addition, an accurate pre-synchronization of the time offset of the clock sources, which is only very technically complex, is not absolutely necessary.

A signal, for example a transmission signal or a received transmission signal, preferably has an amplitude, a frequency, and a phase (and possibly noise).

In particular, the word duplex refers to the directional dependence of a transmission channel, wherein an (approximately) simultaneous or chronologically overlapping signal transmission is possible in both directions using a full-duplex channel.

It is preferred that the method furthermore comprises a comparison step, in which:
  in the second transceiver unit, a comparison signal is formed from a first corrected, received transmission signal and the second transmission signal, wherein the comparison signal is transmitted, in particular communicated, from the second transceiver unit to the first transceiver unit; and
  in the first transceiver unit, a comparison signal is formed from a second corrected, received transmission signal and the first transmission signal, wherein the comparison signal is transmitted, in particular communicated, from the first transceiver unit to the second transceiver unit;
  wherein in a first step preferably deviations of the comparison signals which are induced by systematic deviations in the transceiver units are reduced, preferably compensated, wherein in a second step preferably at least one complex value from a first of the two comparison signals or from a signal which was derived from this first comparison signal is used to adapt at least one complex value of the second of the two comparison signals or a value of a signal which was derived from this second comparison signal and thus form an adapted signal, wherein the adaptation takes place in such a way that the vectorial sum or the difference of the complex values is formed by a mathematical operation or the sum or the difference of the phases of the complex values is formed.

In particular, in the pre-correction step in the transceiver unit and in the transceiver unit, a frequency spectrum is calculated in which a frequency peak is determined in each case. The frequency peaks are preferably exchanged between the stations, wherein the correction values are furthermore preferably calculated on the basis of the frequency peaks. In this way, the correction values can be determined in an easy and rapid manner and/or exchanged between the transceiver units.

In one specific embodiment, the correction values are in particular calculated as follows:
  a correction value as a division of a frequency peak by the number of the subcarriers and multiplication by pi,
  a further correction value for each subcarrier as a difference of the frequency peak, divided by the number of the subcarriers, and multiplication by pi and a subcarrier number, and
  a time-dependent correction value as the division of the present time by the symbol duration and multiplication by two times pi.

In this way, the correction values can be calculated in a rapid and computationally efficient manner. In addition, by way of the correction values, after the application of the correction values to the received signals, all remaining interference variables are complex conjugated to one another and can be further processed using the method of the prior application.

The method preferably furthermore comprises a reconstruction step, in which distances and/or relative velocities between the at least two transceiver units are determined from the corrected, received transmission signals (in particular after the pre-correction step and/or the comparison step). A high accuracy can be achieved in this way.

In one embodiment, distances and/or relative velocities and/or angles of passive objects are determined in the reconstruction step, wherein in particular further transceiver units communicated via transmission signals, which are modulated according to the OFDM method, with the at least two transceiver units. A particularly high accuracy can be achieved in this way.

It is preferred that each of the transceiver units sends and/or receives transmission signals via antenna elements of the transceiver units designed for this purpose at least essentially simultaneously (or chronologically overlapping) via at least one channel. The channel is preferably (at least essentially) reciprocal for the transceiver units.

In a further embodiment, in the transmission step, the first transceiver unit and the second transceiver unit have a line of sight connection to one another, so that interferences caused by multipath propagation can be reduced in particular.

It is preferred that the method furthermore comprises a synchronization step, in which a time offset, a time drift, and/or a sending frequency of clock sources which the transceiver units have is/are exchanged, in particular via radio, by which clock offsets and/or the clock rates of the clock sources can be brought closer (equalized) to one another.

In particular, a simultaneous transmission of useful data takes place on subchannels and/or symbols provided for this purpose, by which data can be exchanged between the transceiver units, which are used in particular for the pre-correction step and/or the reconstruction step and/or the synchronization step.

Preferably, only a specific selection of send-receive channels is used, wherein in particular a compressed sensing method is applied in the reconstruction step, by which the processing demands can be reduced.

In the compressed sensing method, for example, not all subcarriers of the OFDM-modulated transmission signals are occupied (which can be the case, however). In addition, the occupancy of the subcarriers of the OFDM-modulated transmission signals can in particular change chronologically, for example from symbol to symbol. In particular, the compressed sensing method can thus take place in one or more dimensions.

Furthermore, the send-receive channels are preferably assigned varying over time, in particular according to a stepped carrier method, by which the sampling demands can be reduced.

In the stepped carrier method, the overall bandwidth of the OFDM-modulated signal is allocated to reduce the base bandwidth. Each symbol is preferably divided into a certain number of subsymbols, each individual one of which has a relatively low bandwidth. For a high measuring range resolution, however, a high overall bandwidth can be necessary, so that the subsymbols are preferably upconverted to various carrier frequencies. According to the embodiment, the carrier frequencies are each increased by the bandwidth of the baseband signal after each formation of the subsymbol, so that a step pattern results, if one plots the frequency over time for multiple subsymbols. The combination of a certain number of subsymbols is defined as a block and the stepped-OFDM-modulated (transmission) signal consists of multiple successive blocks.

A detailed description of a stepped carrier method is found, for example, in the publication of B. Schweizer, C. Knill, D. Schindler, and C. Waldschmidt, "Stepped-Carrier OFDM-Radar Processing Scheme to Retrieve High-Resolution Range-Velocity Profile at Low Sampling Rate," *IEEE Trans. Microw. Theory Tech.*, vol. 66, no. 3, pp. 1610-1618, 2017.

In one embodiment, the transceiver units move relative to one another, in particular during the transmission step. Positions and alignments of the transceiver units are preferably detected. The reconstruction step can be carried out multiple times in succession. Results of the reconstruction steps can be offset with one another by means of a synthetic aperture calculation. Particularly good results, in particular particularly high radar image resolutions, can be achieved using the synthetic aperture calculation.

In a further embodiment, the transceiver units move relative to one another, in particular during the transmission step. Positions or alignments of the transceiver units (S1, S2) are preferably detected. The reconstruction step (in which positions and/or alignments and/or relative velocities of the transceiver units are determined) can be carried out multiple times in succession. Results of the (respective) reconstruction step can be offset with one another by means of an inverse synthetic aperture calculation. Particularly good results can be achieved using the inverse synthetic aperture calculation, in particular a particularly high accuracy of the position and/or alignment and/or relative velocity determination, since reflections on passive objects can be suppressed by the relative movement between the transceiver stations.

In addition, the object of the invention is achieved by a radar system, in particular a secondary radar system, for determining a distance and/or a relative velocity, in particular for carrying out the above method, having:
  at least two transceiver units, which are in particular spatially separated from one another, and are designed to send and receive transmission signals which are modulated according to an orthogonal frequency multiplexing method, OFDM method;
  a signal processing unit, which is designed to determine correction values from the received transmission signals, and preferably to post process the received transmission signals by means of the correction values, so that effects of interference variables, in particular of phase noise and/or a time offset and/or unknown initial phase positions, are reduced, preferably compensated.

The radar system according to the invention has the advantages which have already been described with reference to the method for reducing interference effects in a radar system.

The features described in conjunction with the method for reducing interference effects in a radar system and advantages linked thereto are also combinable with the radar system according to the invention and can be implemented in particular as a corresponding configuration of the system, in particular of the signal processing unit.

The signal processing unit is preferably furthermore designed to:
  form a comparison signal from a first corrected, received transmission signal and the second transmission signal, wherein the comparison signal is transmitted, in particular communicated, from the second transceiver unit to the first transceiver unit; and/or
  form a comparison signal from a second corrected, received transmission signal and the first transmission signal, wherein the comparison signal is transmitted, in particular communicated, from the first transceiver unit to the second transceiver unit;
  wherein the signal processing unit is preferably designed to reduce, preferably to compensate, deviations of the comparison signals which are induced by systematic deviations in the transceiver units, and in particular to use at least one complex value from a first of the two comparison signals or from a signal which was derived from this first comparison signal to adapt at least one complex value of the second of the two comparison signals or a value of a signal which was derived from this second comparison signal and thus form an adapted signal, wherein the adaptation preferably takes place in such a way that the vectorial sum or the difference of the complex values is formed or the sum or the difference of the phases of the complex values is formed by a mathematical operation.

The transceiver units are preferably designed to communicate with a clock unit, wherein the clock unit is designed to provide a system clock and/or a sending starting point to the transceiver units. The system clock and/or sending starting point of the transceiver units can be equalized (moved toward) one another using a clock unit.

In one embodiment, each of the transceiver units furthermore has antenna elements, which are designed to send and receive at least essentially simultaneously (or chronologically overlapping) via at least one channel. The channel is preferably (approximately) reciprocal for the transceiver units.

Furthermore, the object of the invention is achieved by the use of the above method and/or the above system for mobile devices, preferably for vehicles, in particular unmanned aircraft or preferably passenger vehicles and/or trucks.

All features and advantages linked thereto, which have been described in conjunction with the method according to the invention for reducing interference effects in a radar system and the radar system according to the invention, are in turn applicable and transferable to the use according to the invention of the method.

Insofar as calculations, evaluations, or other method steps are carried out in the (respective) transceiver unit, this also includes a possibly physically independent evaluation device, which is connected to the transceiver unit. For example, the transceiver unit can thus be understood as an arrangement made up in particular of one or more antennas having a few signal-generating or signal-processing components, while further components such as the signal comparison units or an evaluation device are connected as structurally independent components to such an arrangement. If components are used, insofar as technically implementable, they can be designed as so-called hardware made of processing components and/or as signal or data processing steps executed entirely or partially in a processor.

In general, the possibly provided evaluation device is in particular part of one or more (both) transceiver units or is connected to one or more (both) such transceiver units. A physically independent evaluation device can possibly be provided, which is connected to the respective transceiver unit or the remaining components of the respective transceiver unit. Alternatively, the evaluation device can possibly be (partially or completely) integrated in the first and/or the further noncoherent transceiver unit, for example, in a common housing and/or as a structural unit.

Further embodiments result from the dependent claims.

The invention is explained further hereinafter on the basis of nonrestrictive exemplary embodiments with reference to the appended drawings. In the figures.

DERIVATION OF THE SIGNAL MODEL

The signal model is derived hereinafter on the basis of an exemplary embodiment of the radar system R according to the invention. In this exemplary embodiment, the radar system R has two transceiver units S1, S2, which send and receive transmission signals sigTX1, sigTX2 modulated according to an OFDM method, wherein the transmission signals sigTX1, sigTX2 have multiple subcarriers subC1, subC2 orthogonal to one another. The orthogonal subcarriers are allocated in this exemplary embodiment in such a way that the transceiver unit S1 sends on the subcarriers $n_1=0, 2, 4, \ldots, N-2$ and transceiver unit S2 sends on the subcarriers $n_2=1, 3, 5, \ldots, N-1$.

The transmission signals sigTX1, sigTX2 having the subcarriers $n_1$, $n_2$ are each received by the other transceiver unit S1, S2, wherein non-occupied subcarriers $n_u$ can be used for a monostatic radar measurement, thus for detecting passive objects (radar targets).

Figure 2:
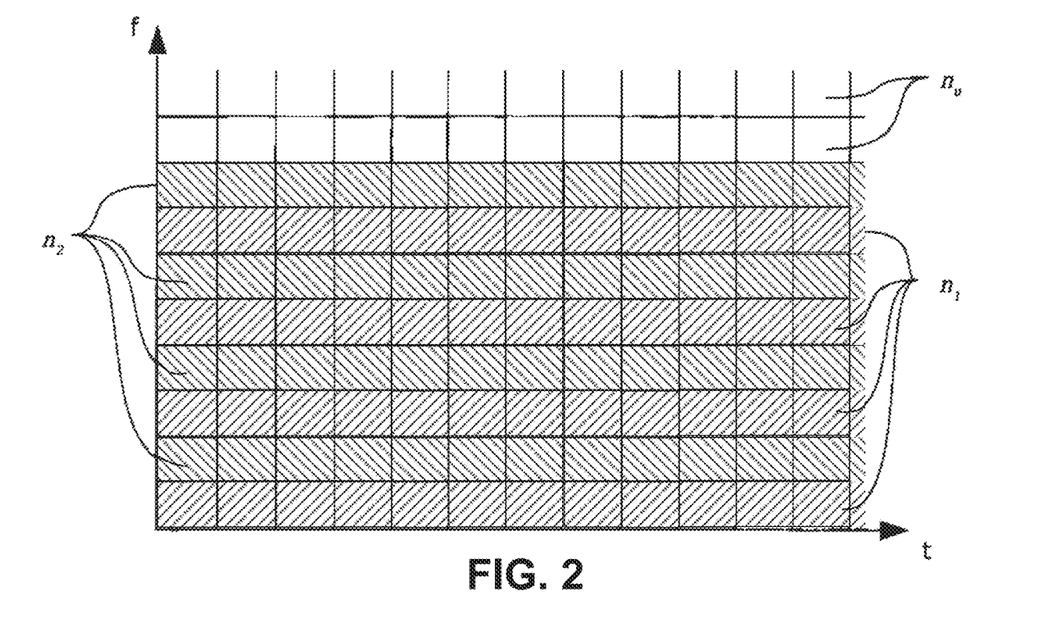
FIG. 2 shows frequency curves in the baseband for non-synchronized clock sources of the transceiver units as are found in the prior art.

The occupancy of this exemplary embodiment is shown in FIG. 2, wherein the number of the occupied subchannels is N=8 for better visibility. In practice, the number of the occupied subcarriers N is a significantly greater value than 8, for example, 1024 or more.

In addition, it is also possible that both transceiver units S1, S2 send on the same subcarriers $n_1=n_2$. The time offset of the transmission signals sigTX1, sigTX2 can be set matching for this purpose in such a way that homodyne and heterodyne radar signals are separable. Furthermore, a part of the subcarriers nit can also be used simultaneously for communication, which can be advantageous (in particular for the exchange of data or signals).

Before the actual radar measurement, it is preferably presumed that the time drift, which causes intercarrier interference (ICI), by which the orthogonality condition between the subcarriers is disturbed, is or was corrected. The time drift can result, on the one hand, in an error in the sampling times and, on the other hand, in a frequency error, since the phase-locked loops S102, S202 multiply the existing system clock.

In addition, it is preferably assumed that the time offset $\Delta\tau$ is sufficiently small, which in particular means that the uniqueness range of a distance measurement, in consideration of the time offset $\Delta\tau$, is not exceeded. The time offset $\Delta\tau$ can be, for example, at most 1 µs, preferably 100 ns or in particular less.

Both above-mentioned conditions can be achieved, for example, by a synchronization method, as described, for example in H. Abdzadeh-Ziabari and M. G. Shayesteh, "Robust Timing and Frequency Synchronization for OFDM Systems," *IEEE Trans. Veh. Technol.*, vol. 2, no. 4, pp. 822-839, 2003.

In addition, $T_{OFDM}=T+T_G$ preferably applies for the sending duration of a OFDM symbol, wherein T denotes the elementary symbol duration and $T_G$ corresponds to the duration of a so-called guard interval, also called cyclic prefix.

The additional time which was added by the guard interval (cyclic prefix) to each OFDM symbol is preferably used to compensate (or reduce) effects which can arise due to multipath propagation. In particular in the case of a rough pre-synchronization, the guard interval can be taken into consideration in addition to a maximum propagation time in the transmission channel and the expected time offset $\Delta\tau$.

Furthermore, in particular $\Delta f=1/T$ applies for the frequency offset $\Delta f$ of N orthogonal subcarriers. The individual subcarriers $n_1$, $n_2$ then send at the frequencies $f_n=n\cdot\Delta f=n/T$.

To take into consideration a possible synchronization error, the times $t_1$ and $t_2$ are introduced at the transceiver units S1 and S2. In the baseband, the transmission signals of the two stations S1, S2 can thus be described as $$s_{1,tx}^b(t_1) = \sum_{m=0}^{M-1}\sum_{n_1}^{N-1} a_1(mN+n_1)\cdot e^{j2\pi f_{n_2} t_1} \cdot \text{rect}\left(\frac{t_1-mT_{OFDM}}{T_{OFDM}}\right) und \quad (1)$$

$$s_{2,tx}^b(t_2) = \sum_{m=0}^{M-1}\sum_{n_1=2n+1}^{N-1} a_2(mN+n_2)\cdot e^{j2\pi f_{n_2} t_2} \cdot \text{rect}\left(\frac{t_2-mT_{OFDM}}{T_{OFDM}}\right) \quad (2)$$

wherein a total of M successive symbols are sent. The function rect $(t/T_0)$ describes a rectangular window of the duration $T_0$ and $f_{n1}$ and $f_{n2}$ are the frequency offset between the subcarriers of the transceiver units S1 and S2.

In contrast to a communication application or a homodyne radar system for detecting passive objects (radar targets), the modulation of the subcarriers $a_1$ and $a_2$ of the respective other station is preferably known. Known symbols or symbol subcarriers are referred to as pilot symbols or pilot subcarriers. The type of modulation of the transceiver units S1 and S2 is preferably selected to be identical. An in-phase quadrature (IQ) modulation is preferred, using a sufficiently low peak to average power ratio (PAPR), the ratio of power to the average power, can be achieved.

For transmission via a radio channel, the baseband signals are each modulated using the high-frequency carriers $$s_{1,lo}(t_1) = e^{j(2\pi f_c t_1 + \varphi_{PN1,m}(t_1) + \varphi_{01,m})} \text{ und} \tag{3}$$

$$s_{2,lo}(t_2) = e^{j(2\pi f_c t_2 + \varphi_{PN2,m}(t_2) + \varphi_{02,m})} \tag{4}$$

which have the carrier frequency $f_c$. Since these are spatially distributed clock sources S101, S102 (oscillators), the initial phases $\varphi_{01,m}$ and $\varphi_{02,m}$ of the symbols are different and unknown. Furthermore, the phase noise processes $\varphi_{PN1,m}(t_1)$ and $\varphi_{PN2,m}(t_2)$ of the two spatially separated transceiver units S1, S2 are different and uncorrelated. After the sending-side modulation using the high-frequency (HF) carriers, the two transmission signals can be represented as $$s_{1,tx}(t_1) = \sum_{m=0}^{M-1} \sum_{n_1=2n}^{N-1} \alpha_1(mN + n_1) \cdot \tag{5}$$

$$e^{j2\pi f_{n_1} t_1} \cdot rect\left(\frac{t_1 - mT_{OFDM}}{T_{OFDM}}\right) \cdot e^{j(2\pi f_c t_1 + \varphi_{pN1,m}(t_1) + \varphi_{01,m})} \text{ und}$$

$$s_{2,tx}^b(t_2) = \sum_{m=0}^{M-1} \sum_{n_1=2n+1}^{N-1} \alpha_2(mN + n_2) \cdot \tag{6}$$

$$e^{j2\pi f_{n_2} t_2} \cdot rect\left(\frac{t_2 - mT_{OFDM}}{T_{OFDM}}\right) \cdot e^{j(2\pi f_c t_2 + \varphi_{PN2,m}(t_2) + \varphi_{02,m})}$$

The time offset between the two transceiver units can be taken into consideration via the relationship $$t_1 = t \text{ or } t_2 = t - \Delta\tau \tag{7}$$

wherein t corresponds to the time in the physical meaning here. It would also be conceivable that transceiver unit S1 is operated offset by $\pm\Delta\tau/2$ and transceiver unit S2 is operated offset by $\pm\Delta\tau/2$. After using the representation given in equation (7), the following applies for the transmission signals of the two transceiver units S1, S2:

$$s_{1,tx}(t) = \sum_{m=0}^{M-1} \sum_{n_1=2n}^{N-1} \alpha_1(mN + n_1) \cdot \tag{8}$$

$$e^{j2\pi f_{n_1} t} \cdot rect\left(\frac{t - mT_{OFDM}}{T_{OFDM}}\right) \cdot e^{j(2\pi f_c t + \varphi_{PN1,m}(t) + \varphi_{01,m})} \text{ und}$$

$$s_{2,tx}^b(t) = \sum_{m=0}^{M-1} \sum_{n_2=2n+1}^{N-1} \alpha_2(mN + n_2) \cdot e^{j2\pi f_{n_2}(t-\Delta\tau)} \cdot \tag{9}$$

$$rect\left(\frac{t - \Delta\tau - mT_{OFDM}}{T_{OFDM}}\right) \cdot e^{j(2\pi f_c(t-\Delta\tau) + \varphi_{PN2,m}(t-\Delta\tau) + \varphi_{02,m})}$$

The signals represented in equations (8) and (9) are sent simultaneously via a radio channel and each received by the other transceiver unit.

It is assumed here that there is precisely one signal path or at least one dominant signal path. If an arbitrary scenario having random propagation paths is studied, an antenna element is necessary at each transceiver unit S1, S2, which is used simultaneously for sending and receiving.

Furthermore, it is assumed that the transceiver units (radar units) or the passive objects (radar targets) move at constant velocity.

A position change during the entire sending sequence can be assumed to be sufficiently small. A runtime in the transmission channel can thus be specified as $\tau(t) = \tau + v \cdot t$ wherein the relative velocity v results in a carrier frequency-dependent Doppler shift $f_D$ of the reception signals of the transceiver units. Since the channel damping in both directions is assumed to be at least approximately identical and can be expressed by a complex number, it is neglected in the derivation. The reception signals of the transceiver units may thus be specified as follows:

$$s_{1,rx}(t) = s_{2,tx}(t - \tau)e^{j2\pi f_D t} = \sum_{m=0}^{M-1} \sum_{n_2=2n+1}^{N-1} \alpha_2(mN + n_2) \cdot e^{j2\pi f_{n_1}(t-\Delta\tau-\tau)} \cdot \tag{10}$$

$$e^{j2\pi f_D t} rect\left(\frac{t - \Delta\tau - \tau - mT_{OFDM}}{T_{OFDM}}\right) \cdot$$

$$e^{j(2\pi f_c(t-\Delta\tau-\tau) + \varphi_{PN2,m}(t-\Delta\tau-\tau) + \varphi_{02,m})} \text{ und}$$

$$s_{2,rx}(t) = s_{1,tx}(t - \tau)e^{j2\pi f_D t} = \sum_{m=0}^{M-1} \sum_{n_1=2n}^{N-1} \alpha_1(mN + n_1) \cdot \tag{11}$$

$$e^{j2\pi f_{n_2}(t-\tau)} \cdot rect\left(\frac{t - \tau - mT_{OFDM}}{T_{OFDM}}\right) \cdot e^{j(2\pi f_c(t-\tau) + \varphi_{PN1,m}(t-\tau) + \varphi_{01,m})}$$

The received signals are downmixed with the HF signal of the respective transceiver unit S1, S2 in the mixer S105 or S205. For this purpose, an in-phase and quadrature mixer is necessary on the receiving side. The baseband signals after the mixing process and a suitable low-pass filtering can be described as $$s_{1,rx}^b(t) = \tag{12}$$

$$s_{1,rx}(t) \cdot (s_{1,lo}(t))^* \sum_{m=0}^{M-1} \sum_{n_2=2n+1}^{N-1} \alpha_2(mN + n_2) \cdot e^{j2\pi f_{n_2}(t-\Delta\tau-\tau)} \cdot e^{j2\pi f_D t} \cdot$$

$$rect\left(\frac{t - \Delta\tau - \tau - mT_{OFDM}}{T_{OFDM}}\right) \cdot$$

$$e^{j(-2\pi f_c(\Delta\tau+\tau) + \varphi_{PN2,m}(t-\Delta\tau-\tau) - \varphi_{PN1,m}(t) + \varphi_{02,m} - \varphi_{01,m})} \text{ und}$$

$$s_{2,rx}^b(t) = s_{2,rx}(t) \cdot (s_{2,lo}(t))^* = \tag{13}$$

$$\sum_{m=0}^{M-1} \sum_{n_1=2n}^{N-1} \alpha_1(mN + n_1) \cdot e^{j2\pi f_{n_1}(t-\tau)} e^{j2\pi f_D t} \cdot rect\left(\frac{t - \Delta\tau - mT_{OFDM}}{T_{OFDM}}\right) \cdot$$

$$e^{j(-2\pi f_c(\Delta\tau-\tau) + \varphi_{PN1,m}(t-\tau) - \varphi_{PN2,m}(t-\Delta\tau) + \varphi_{02,m} - \varphi_{01,m})}$$

The phase noise during an OFDM symbol is assumed to be sufficiently small. Furthermore, it is assumed that the time offset and the runtime in the transmission channel are sufficiently small. The phase noise is therefore strongly correlated in both reception channels and can be approximated as $$e^{j(\varphi_{PN2,m}(t) - \varphi_{PN1,m}(t-\tau+\Delta\tau))} \approx e^{j(\varphi_{PN2,m}(t-\Delta\tau-\tau) - \varphi_{PN1,m})} \approx$$

$$1 + j\varepsilon_m(t) \tag{14}$$

Using this approximation, the reception signal in the transceiver unit S1 may be represented as the following:

$$x_1(t) \approx \sum_{m=0}^{M-1} \sum_{n_2=2n+1}^{N-1} \alpha_2(mN+n_2) \cdot e^{j2\pi f_{n_2}(t-\Delta\tau-\tau)} \cdot e^{j2\pi f_D t} \cdot \qquad (15)$$

$$rect\left(\frac{t-\Delta\tau-\tau-mT_{OFDM}}{T_{OFDM}}\right) \cdot e^{j(2\pi f_c(-\Delta\tau-\tau)-\varphi_{0,m})}(1+j\varepsilon_m(t))$$

In addition, the difference of the initial phases is represented in abbreviated form in equation (15) by the variable $$\varphi_{0,m}=\varphi_{01,m}-\varphi_{02,m} \qquad (16)$$

For the reception signal of the transceiver unit S2, it is additionally taken into consideration that the sampling is also time delayed, which can be expressed by the (back) transformation tl→t+Δτ. The influence of this time delay on the Doppler shift is assumed to be practically negligible and the phase noise is also approximated, which results in $$x_2 = s_{2,rx}^b(t+\Delta\tau) \approx \sum_{m=0}^{M-1} \sum_{n_1=2n}^{N-1} \alpha_1(mN+n_1) \cdot e^{j2\pi f_{n_1}(t+\Delta\tau-\tau)} \cdot e^{j2\pi f_D t} \cdot \qquad (17)$$

$$rect\left(\frac{t+\Delta\tau-\tau-mT_{OFDM}}{T_{OFDM}}\right) \cdot e^{j(2\pi f_c(\Delta\tau-\tau)+\varphi_{0,m})}(1+j\varepsilon_m(t))$$

The signals described in equations (15) and (17) are now sampled, wherein $f_s=T/N$ is to apply for the sampling frequency.

Pre-Correction Step

The signals represented in equations (15) and (17) in particular have the following interference variables:
time offset $\Delta\tau$;
unknown phase shift $\varphi_{0,m}$; and/or
phase noise (fast time) $\varepsilon_m(t)$;
which are corrected first. That is, a fast Fourier transform (FFT) of the received and sampled signals is performed in the respective transceiver unit S1, S2.

In the present exemplary embodiment, in a pre-correction step VS2, first the effect of the above-mentioned interference variables on the signals received in the transceiver units is reduced (compensated), wherein the interference variables of both transceiver units are moved toward one another (equalized).

In a reconstruction step VS4, an accurate estimation of distance, velocity, and initial phase is possible by a comparison of the (corrected) signals of the two transceiver units.

In a further exemplary embodiment, a comparison signal can be generated, which has comparable properties like, for example, signals from a homodyne mixing process in homodyne radar systems.

To calculate the interference variables, first an FFT of the signals from equations (15) and 17) is calculated. The expanded sending symbols, thus the cyclic prefix, are removed. At the two transceiver units S1 and S2, neglecting $\varepsilon_m(t)$ and with $f_{n1}=2\cdot n$ and $f_{n2}=2\cdot n+1$, the following discrete signals result $$y_1[n,m] \approx e^{-j2\pi f_{n2}(\Delta\tau+\tau)}e^{j2\pi f_D m T_{OFDM}} \cdot e^{j(2\pi f_c(-\Delta\tau-\tau)-\varphi_{0,m})} = \qquad (18)$$

$$e^{-j2\pi\frac{2n+1}{T}(\Delta\tau+\tau)}e^{j2\pi f_D m T_{OFDM}} \cdot e^{j(2\pi f_c(-\Delta\tau-\tau)-\varphi_{0,m})} und$$

$$y_2[n,m] \approx e^{-j2\pi f_{n1}(-\Delta\tau+\tau)}e^{j2\pi f_D m T_{OFDM}} \cdot e^{j(2\pi f_c(\Delta\tau-\tau)-\varphi_{0,m})} = \qquad (19)$$

$$e^{-j2\pi\frac{2n}{T}(-\Delta\tau+\tau)}e^{j2\pi f_D m T_{OFDM}} \cdot e^{j(2\pi f_c(\Delta\tau-\tau)-\varphi_{0,m})}.$$

An effect of the Doppler effect is assumed to be small, which has the result that the phase shift caused in this way only affects successive symbols. If this assumption does not apply, the Doppler shift in particular results in ICI. Compensation methods for the ICI occurring due to Doppler shift are found in J. Lim, S. R. Kim, and D. J. Shin, "Two-Step Doppler Estimation Based on Intercarrier Interference Mitigation for OFDM Radar," *IEEE Antennas Wirel. Propag. Lett.*, vol. 14, pp. 1726-1729, 2015, and by G. Hakobyan and B. Yang, "A Novel Intercarrier-Interference Free Signal Processing Scheme for OFDM Radar," *IEEE Trans. Veh. Technol.*, vol. 67, no. 6, pp. 5158-5167, 2018, wherein the latter method does not require specific coding, however, due to which it can preferably be combined in an exemplary embodiment with the method according to the invention.

In particular the distance between the transceiver units and/or passive objects or the runtime in the transmission channel can be calculated by an FFT over the index n.

In a further exemplary embodiment, the result of the FFT is improved, so that in particular an accurate and non-integer value is obtained, in that the result of the FFT is preferably ascertained by zero padding and parabolic interpolation. Furthermore, the use of a window function in multiple signals can result in a suppression of secondary maxima.

In addition, the accuracy of the results can be further increased in particular by averaging over multiple symbols, wherein first the time offset $\Delta\tau$ has to be determined. The determination of the time offset $\Delta\tau$ can preferably be enabled via a comparison of both received signals.

After the FFT of the received signals has been calculated, in the frequency spectrum, the spectral frequency peaks of the transceiver unit S1 and the transceiver unit S2 can be determined:

$$k_1=2N(\tau+\Delta\tau)/T \text{und} \qquad (20)$$

$$k_2=2N(\tau-\Delta\tau)/T \text{und} \qquad (21)$$

From the previously determined frequency peaks $k_1$, $k_2$, two correction values $y_1$, $y_n$, can then be determined:

$$\gamma_1 := \frac{\pi k_1}{N} = -2\pi\frac{\Delta_{T-T}}{T} und \qquad (22)$$

$$\gamma_n := \pi n\frac{k_1-k_2}{N} = 4\pi n\frac{\Delta\tau}{T}. \qquad (23)$$

Since the transceiver unit S2 sends in this exemplary embodiment on the odd subcarriers $n_2$, the third correction value $\gamma_2$ $$\gamma_2=2\pi t/T \qquad (24)$$

is determinable independently of the frequency peaks $k_1$, $k_2$, thus the measured scenario. The received transmission signals, which are specified in equations (15) and (17), are now corrected using the correction values $\gamma_1$, $\gamma_n$, $\gamma_2$:

First, for example, the offset of the subcarriers in the first transceiver unit S1 can be corrected using the correction value $y_2$ from equation (24). With $f_n=(2\cdot n+1)/T$, this results in the following:

$$x_1'(t) = \quad \text{(i)}$$

$$x_1(t) \cdot e^{-j\gamma_2} \approx \sum_{m=0}^{M-1}\sum_{n=0}^{N/2-1} \alpha_2(mN+2n+1) \cdot e^{j2\pi\frac{2n+1}{T}(t-\Delta\tau-\tau)} \cdot e^{j2\pi f_D t} \cdot e^{-j\pi\frac{t}{T}} \cdot$$

$$rect\left(\frac{t-\Delta\tau-\tau-mT_{OFDM}}{T_{OFDM}}\right) \cdot e^{j(2\pi f_C(-\Delta\tau-\tau)-\varphi_{0,m})}(1+j\varepsilon_m(t)) =$$

$$\sum_{m=0}^{M-1}\sum_{n=0}^{N/2-1} \alpha_2(mN+2n+1) \cdot e^{j4\pi\frac{n}{T}(t-\Delta\tau-\tau)} \cdot e^{j2\pi f_D t} \cdot e^{-j2\pi\frac{\Delta\tau+\tau}{T}} \cdot$$

$$rect\left(\frac{t-\Delta\tau-\tau-mT_{OFDM}}{T_{OFDM}}\right) \cdot e^{j(2\pi f_C(-\Delta\tau-\tau)-\varphi_{0,m})}(1+j\varepsilon_m(t)).$$

The two further correction values y1, Yn from equations (22) and (23) can now be applied to the signal from equation (25). This results in the following:

$$z_1(t) = x_1'(t) \cdot e^{-\frac{j\gamma_1}{2}} \cdot e^{j\gamma_n} \approx \quad \text{(26)}$$

$$\sum_{m=0}^{M-1}\sum_{n=0}^{N/2-1} a_2(mN+2n+1) \cdot e^{j4\pi\frac{n}{T}(t-\Delta\tau-\tau)} \cdot e^{j2\pi f_D t} e^{j4\pi n\frac{\Delta\tau}{T}} \cdot$$

$$rect\left(\frac{t-\Delta\tau-\tau-mT_{OFDM}}{T_{OFDM}}\right) e^{j(2\pi f_C(-\Delta\tau-\tau)-\varphi_{0,m})} e^{j\pi\frac{\Delta\tau+\tau}{T}}(1+j\varepsilon_m(t)) =$$

$$\sum_{m=0}^{M-1}\sum_{n=0}^{N/2-1} \alpha(mN+2n) \cdot e^{j4\pi\frac{n}{T}(t-\tau)} \cdot e^{j2\pi f_D t} \cdot rect\left(\frac{t-\Delta\tau-\tau-mT_{OFDM}}{T_{OFDM}}\right) \cdot$$

$$e^{j(2\pi f_C(-\Delta\tau-\tau)-\varphi_{0,m}')}(1+j\varepsilon_m(t)).$$

If the correction values $y_1$ and $y_n$ are applied to the received signal of the second transceiver unit S2, this results in the following:

$$z_2(t) = x_2(t) \cdot e^{-\frac{j\gamma_1}{2}} \cdot e^{j\gamma_n} \approx \quad \text{(27)}$$

$$\sum_{m=0}^{M-1}\sum_{n=0}^{N/2-1} \alpha(mN+2n) \cdot e^{j4\pi\frac{n}{T}(t-\tau)} \cdot e^{j2\pi f_D} \cdot rect\left(\frac{t+\Delta\tau-\tau-mT_{OFDM}}{T_{OFDM}}\right) \cdot$$

$$e^{j(2\pi f_C(\Delta\tau-\tau)-\varphi_{0,m}')} \cdot e^{j\pi\frac{\Delta\tau+\tau}{T}}(1-j\varepsilon_m(t)).$$

In the last two equations, the known data symbols $a_1$ and $a_2$ were replaced by a. After the application of the previously determined correction values $\gamma_1$, $\gamma_n$, $\gamma_2$, the pre-correction step is completed. It is apparent from equations (26) and (27) that the interference terms now contained in the corrected are complex conjugated to one another and all terms dependent on $\tau$ and $f_D$ are in phase.

Reconstruction Step

In a reconstruction step, further calculations can be carried out using the corrected signals $z_1(t)$, $z_2(t)$ from equations (26) and (27), wherein the discrete time sampling using $f_s=T/N$ has the result that the time variable t is replaced in each case by k·T/N. Sample values (data) of the transceiver units S1 and transceiver units S2 after a discrete Fourier transform (DFT) or an FFT can be represented as $$z_1[n,m] = \sum_{k=0}^{N}(z_1(t)|_{t=kT/N}) \cdot e^{-j2\pi\frac{kn}{N}} = \quad \text{(28)}$$

$$\alpha(mN/2+n) \cdot e^{-j4\pi\frac{n}{T}\tau} \cdot e^{j2\pi f_D mT_{OFDM}} \cdot e^{j(2\pi f_C(-\Delta\tau-\tau)-\varphi_{0,m}'')} + j\varepsilon_m'[n,m]$$

$$z_2[n,m] = \sum_{k=0}^{N}(z_2(t)|_{t=kT/N}) \cdot e^{-j2\pi\frac{kn}{N}} = \quad \text{(29)}$$

$$\alpha(mN/2+n) \cdot e^{-j4\pi\frac{n}{T}\tau} \cdot e^{j2\pi f_D mT_{OFDM}} \cdot e^{j(2\pi f_C(\Delta\tau-\tau)+\varphi_{0,m}'')} - j\varepsilon_m'[n,m]$$

The phase noise can result, on the one hand, in a constant phase offset per symbol, which is expressed by the variable $\varphi_{0,m}''$ and on the other hand, in ICI, which is represented by the variable $\varepsilon_m^c[n,m]$.

The signal model from equations (28) and (29) can possibly be further processed using further methods, for example, as in M. Gottinger, F. Kirsch, P. Gulden, and M. Vossiek, "Coherent Full-Duplex Double-Sided Two-Way Ranging and Velocity Measurement Between Separate Incoherent Radio Units," *IEEE Trans. Microw. Theory Tech.*, vol. 67, no. 5, pp. 2045-2061, 2019, so that possible remaining interference variables can be compensated or the influence of interference variables can be reduced. A detection of distance, relative velocity, and/or runtime-dependent phase between the transceiver units S1 and S2 and/or to passive objects (radar targets) is enabled.

LIST OF REFERENCE SIGNS

S1 first transceiver unit
S2 second transceiver unit
S101 clock source (local oscillator) of the first transceiver unit
S201 clock source (local oscillator) of the second transceiver unit
S102 phase-locked loop (PLL) of the first transceiver unit
S202 phase-locked loop (PLL) of the second transceiver unit
S103 modulator of the first transceiver unit
S203 modulator of the second transceiver unit
S104, S105 mixer of the first transceiver unit
S204, S205 mixer of the second transceiver unit
S106 analog-to-digital (A/D) converter of the first transceiver unit
S206 analog-to-digital (A/D) converter of the second transceiver unit
sigRX1 transmission signal of the first transceiver unit
sigRX2 transmission signal of the second transceiver unit
sigRX1 reception signal of the first transceiver unit
sigRX2 reception signal of the second transceiver unit
sigTX1*b* baseband transmission signal of the first transceiver unit
sigTX2*b* baseband transmission signal of the second transceiver unit
sigRX1*b* baseband reception signals of the first transceiver unit
sigRX2*b* baseband reception signals of the first transceiver unit
A1 HF antenna of the first transceiver unit
A2 HF antenna of the second transceiver unit
R radar system
$n_1$ subcarrier of the first transceiver unit
$n_2$ subcarrier of the second transceiver unit
$n_u$ subcarrier which is not used by any transceiver unit
$\tau(t)$ radio channel

The invention claimed is:

1. A method for reducing interference effects in a radar system, which has at least two radar transceiver units spatially separated form one another, wherein in the method comprises:

transmitting a first transmission signal of a first transceiver unit to a second transceiver unit using a radio channel;

transmitting a second transmission signal of the second transceiver unit to the first transceiver unit using the radio channel, the first and second transmission signals modulated according to an orthogonal frequency multiplex method;

and performing pre-correction, comprising: including determining a frequency spectrum of a received first transmission signal and a received second transmission signal;

determining a first frequency peak k1 corresponding to the received first transmission signal and a second peak k2 corresponding to the received second transmission signal;

and determining correction values γ1, γn, γ2 using the frequency peaks k1, k2 from a received first transmission signal and a received second received transmission signal, the determining the correction values comprising:

forming correction value γ1 by division of the first frequency peak k1 by a number of subcarriers N and multiplication by a constant;

forming the correction value γn for each subcarrier n by determining a difference of the first and second frequency peak k1, k2, division of the difference by the number of the subcarriers N, and multiplication by a constant and a subcarrier number n;

forming a time-dependent correction value γ2 by division of a present time by a symbol duration and multiplication by a constant;

and exchanging the correction values between the first transceiver unit and the second transceiver unit; wherein the received first and second transmission signals are processed using the correction value γ1, γn, γ2, so that influences of interference variables comprising at least one of phase noise, a time offset, or unknown initial phase positions, are reduced.

2. The method of claim 1, further comprising a comparison, the comparison comprising:

forming a first comparison signal in the second transceiver unit from a first corrected, received transmission signal and the second transmission signal, the first comparison signal transmitted, from the second transceiver unit to the first transceiver unit; and forming a second comparison signaling the first transceiver unit from a second corrected, received transmission signal and the first transmission signal, the second comparison signal is transmitted from the first transceiver unit to the second transceiver unit;

in a first operation, reducing deviations of the first and second comparison signals which are induced by systematic deviations in the first and second transceiver units;

in a second operation separate from the first operation, using at least one complex value from a first one of the first and second comparison signals, or from a signal which was derived from the first one of the first and second comparison signals, to adapt at least one complex value of another of the first and second comparison signals, or a value of a signal which was derived from a second one of the first and second comparison signals to form an adapted signal;

wherein the adapting comprises determining a vectorial sum or a difference of the complex values formed or the sum or the difference of the phases of the complex values is formed.

3. The method of claim 1, wherein the pre-correction further comprises exchanging the frequency peaks (k1, k2) between the first and second transceiver units.

4. The method of claim 1, comprising a reconstruction operation wherein at least one of distances, relative velocities, or phase positions between the at least two transceiver units are determined from the received first and second transmission signals.

5. The method of claim 1, comprising a reconstruction operation wherein at least one of distances, relative velocities, phase positions, or angles of passive objects are determined.

6. The method of claim 1, wherein each of the first and second transceiver units sends or receives contemporaneously the first and second transmission signals.

7. The method of claim 1, wherein the transmitting of the first transmission signal and the second transmission signal occurs with the first transceiver unit and the second transceiver unit in line of sight of one another.

8. The method of claim 1, comprising performing synchronization, comprising exchanging via radio at least one of a time offset, a time drift, or a sending frequency of respective clock sources, of the first and second transceiver units.

9. The method of claim 1, comprising transmission of useful data using at least one of subchannels or symbols provided for this purpose, contemporaneously with transmitting of the first transmission signal and the second transmission signal.

10. The method of claim 1, wherein only a certain number of send-receive channels are used, and wherein a compressed sensing method is used for reconstruction of at least one of distances, relative velocities, or phase positions between the first and second transceiver units or between one of the first and second transceiver units and a passive object.

11. The method of claim 1, wherein the radio channel comprises send-receive channels assigned in a chronologically varying manner according to a stepped carrier method.

12. The method of claim 5, wherein the first and second transceiver units move in relation to one another and positions and alignments of the first and second transceiver units are detected, and wherein the reconstruction is carried out multiple times in succession, so that a radar image resolution associated with the reconstruction is increased using a synthetic aperture calculation.

13. The method of claim 4, wherein first and second transceiver units move in relation to one another and positions and alignments of the first and second transceiver unit are detected, and wherein the reconstruction is carried out multiple times in succession, so that an accuracy of the detected positions or alignments of the transceiver units is increased using an inverse synthetic aperture calculation.

14. A radar system for determining at least one of a distance or a relative velocity, the radar system comprising:

at least two radar transceiver units spatially separated from one another and configured to send and receive transmission signals, which are modulated according to an orthogonal frequency division multiplex OFDM method;

and a signal processing unit configured to determine correction values γ1, γn, γ2 from the received transmission signals, including;

determining a frequency spectrum of a received first transmission signal and a received second transmission signal;

determining a first frequency peak k1 corresponding to the received first transmission signal and a second peak k2 corresponding to the received second transmission signal;

and determining the correction values γ1, γn, γ2, using the frequency peaks k1, k2 from a received first transmission signal and a second received transmission signal, the determining the correction values comprising:

forming correction value γ1 by division of the first frequency peak k1 by a number of subcarriers N and multiplication by a constant;

forming the correction value γn for each subcarrier n by determining a difference of the first and second frequency peaks k1, k2, division of the difference by the number of the subcarriers N, and multiplication by a constant and a subcarrier number n;

forming a time-dependent correction value γ2 by division of a present time by a symbol duration and multiplication by a constant;

exchanging the determined correction values γ1, γn, γ2 with the at least two transceiver units;

and processing received transmission signals using the correction values γ1, γn, γ2, so that influences of interference variables comprising at least one of phase noise, a time offset, or unknown initial phase positions, are reduced.

15. The radar system of claim 14, wherein the signal processing unit is further configured to:

form a first comparison signal from a first corrected, received transmission signal and the second transmission signal, wherein the first comparison signal is transmitted from the second transceiver unit to the first transceiver unit; and form a second comparison signal from a second corrected, received transmission signal and the first transmission signal, wherein the second comparison signal is transmitted from the first transceiver unit to the second transceiver unit;

in a first operation, reduce deviations of the first and second comparison signals which are induced by systematic deviations in the first and second transceiver units;

in a second operations separate from the first operation, using at least one complex value from a first one of the first and second comparison signals, or from a signal which was derived from the first one of the first and second comparison signals, adapt at least one complex value of another of the first and second comparison signals, or a value of a signal which was derived from a second one of the first and second comparison signals to form an adapted signal;

wherein the adapting comprises determining a vectorial sum or a difference of the complex values formed or the sum or the difference of the phases of the complex values is formed.

16. The radar system of claim 14, wherein the at least two transceiver units are configured to communicate with a clock unit, and wherein the clock unit is configured to provide at least one of a system clock or a sending starting point to the at least two transceiver units.

17. The radar system of claim 14, wherein the at least two transceiver units comprise antenna elements configured to send and to receive contemporaneously via at least one channel.

18. The radar system of claim 14, wherein the signal processing unit is further configured to exchange the frequency peaks k1, k2 between a first transceiver unit and second transceiver unit of the at least two transceiver units.

* * * * *

UNITED STATES PATENT AND TRADEMARK OFFICE
CERTIFICATE OF CORRECTION

PATENT NO. : 12,313,765 B2
APPLICATION NO. : 17/765392
DATED : May 27, 2025
INVENTOR(S) : Gottinger et al.

It is certified that error appears in the above-identified patent and that said Letters Patent is hereby corrected as shown below:

In the Claims

In Column 15, Line 4, in Claim 1, delete "form" and insert --from-- therefor

In Column 15, Line 4, in Claim 1, after "wherein", delete "in"

In Column 15, Line 13, in Claim 1, after "method;", insert --and--

In Column 15, Line 14, in Claim 1, before "performing", delete "and"

In Column 15, Line 14, in Claim 1, after "comprising:", insert a linebreak

In Column 15, Line 14, in Claim 1, after "comprising:", delete "including"

In Column 15, Line 21, in Claim 1, after "signal;", insert --and--

In Column 15, Line 22, in Claim 1, before "determining", delete "and"

In Column 15, Line 32, in Claim 1, delete "peak" and insert --peaks-- therefor

In Column 15, Line 37, in Claim 1, after "constant;", insert --and--

In Column 15, Line 38, in Claim 1, before "exchanging", delete "and"

In Column 15, Line 39, in Claim 1, after "unit;", insert a linebreak

In Column 15, Line 41, in Claim 1, delete "value" and insert --values-- therefor In Column 16, Line 8, in Claim 3, delete "(k1, k2)" and insert --k1, k2-- therefor Signed and Sealed this
Twenty-first Day of October, 2025

John A. Squires
*Director of the United States Patent and Trademark Office*

CERTIFICATE OF CORRECTION (continued)
U.S. Pat. No. 12,313,765 B2

In Column 16, Line 58, in Claim 13, delete "unit" and insert --units-- therefor

In Column 17, Line 3, in Claim 14, after "method;", insert --and--

In Column 17, Line 4, in Claim 14, before "a signal", delete "and"

In Column 17, Line 6, in Claim 14, delete "including;" and insert --including:-- therefor In Column 17, Line 13, in Claim 14, after "signal;", insert --and--

In Column 17, Line 14, in Claim 14, before "determining", delete "and"

In Column 17, Line 14, in Claim 14, delete "γ2," and insert --γ2-- therefor

In Column 17, Line 31, in Claim 14, after "units;", insert --and--

In Column 17, Line 32, in Claim 14, before "processing", delete "and"

In Column 18, Line 13, in Claim 15, delete "operations" and insert --operation-- therefor